United States Patent
Fay, II

(10) Patent No.: US 9,750,185 B2
(45) Date of Patent: Sep. 5, 2017

(54) LATCHING DEVICE FOR HEADER MOUNTING APPARATUS

(71) Applicant: CNH Industrial America LLC, New Holland, PA (US)

(72) Inventor: Jeffrey B. Fay, II, Wilmington, DE (US)

(73) Assignee: CNH Industrial America LLC, New Holland, PA (US)

(*) Notice: Subject to any disclaimer, the term of this patent is extended or adjusted under 35 U.S.C. 154(b) by 107 days.

(21) Appl. No.: 14/937,018

(22) Filed: Nov. 10, 2015

(65) Prior Publication Data

US 2017/0127612 A1    May 11, 2017

(51) Int. Cl.
| | |
|---|---|
| *A01D 41/14* | (2006.01) |
| *A01D 47/00* | (2006.01) |
| *A01D 34/28* | (2006.01) |
| *A01B 59/00* | (2006.01) |

(52) U.S. Cl.
CPC .......... *A01D 41/145* (2013.01); *A01B 59/006* (2013.01); *A01D 34/283* (2013.01); *A01D 47/00* (2013.01)

(58) Field of Classification Search
CPC .... A01D 41/145; A01D 41/16; A01D 34/283; A01D 47/00; A01D 89/004; A01D 67/00; A01D 67/005; A01B 59/00; A01B 59/002; A01B 59/006; Y10T 292/0886; Y10T 292/0887; Y10T 292/089; Y10T 292/096; Y10T 292/1014; Y10T 292/1015; Y10T 292/102; Y10S 292/30; Y10S 292/31; B60R 25/0221; B60R 25/005; B60R 25/066

See application file for complete search history.

(56) References Cited

U.S. PATENT DOCUMENTS

| | | | | |
|---|---|---|---|---|
| 1,021,740 | A | * | 3/1912 | Leighton ................. E05C 9/043 292/148 |
| 1,274,498 | A | | 8/1918 | Baker et al. |
| 1,460,991 | A | * | 7/1923 | Van Alstyne ....... E05B 17/2088 292/106 |
| 1,626,834 | A | * | 5/1927 | Hull ....................... E05B 83/02 292/340 |
| 1,737,730 | A | | 12/1929 | Reidhaar |
| 1,760,187 | A | * | 5/1930 | Brenne ................... E05C 9/048 292/2 |
| 2,354,962 | A | | 8/1944 | Oehler et al. |
| 2,595,357 | A | | 5/1952 | Haseltine |
| 2,937,541 | A | | 5/1960 | Barlow |
| 3,188,128 | A | * | 6/1965 | Olander .................. E05B 83/10 292/240 |
| 3,209,564 | A | * | 10/1965 | Pelcin ..................... E05C 1/145 292/173 |
| 3,488,930 | A | * | 1/1970 | Feldmann .............. A01D 41/16 56/11.9 |

(Continued)

*Primary Examiner* — Alicia Torres
*Assistant Examiner* — Adam Behrens
(74) *Attorney, Agent, or Firm* — Patrick M. Sheldrake

(57) ABSTRACT

A header is removably attached to lift arms of an agricultural harvester by mounting pins received in upwardly facing recesses on the ends of lift arms. A bar is moved into locking position by a lever arm mounted on the lift arms to hold the header mounting pins in place. A hook shaped latching device is pivotally mounted on the lift arm adjacent the lever arm for capturing it in place against the lift arm.

12 Claims, 4 Drawing Sheets

(56) References Cited

U.S. PATENT DOCUMENTS

| | | | | |
|---|---|---|---|---|
| 3,544,145 A * | 12/1970 | Cerutti | ............... | E05B 83/10 |
| | | | | 292/218 |
| 3,622,187 A * | 11/1971 | Emery | ............... | E05C 9/043 |
| | | | | 292/139 |
| 3,665,688 A * | 5/1972 | Sheehan | ............ | A01D 41/14 |
| | | | | 56/14.6 |
| 4,030,274 A * | 6/1977 | Reber | ............ | A01D 89/004 |
| | | | | 56/13.5 |
| 5,535,578 A * | 7/1996 | Honey | ............ | A01D 41/145 |
| | | | | 56/14.9 |
| 5,718,467 A * | 2/1998 | Weinerman | ......... | E05B 15/0006 |
| | | | | 292/218 |
| 6,073,431 A * | 6/2000 | Osborne | ............ | A01D 41/16 |
| | | | | 56/15.7 |
| 2007/0163220 A1 * | 7/2007 | Ehrhart | ............ | A01D 34/283 |
| | | | | 56/10.2 E |
| 2008/0142231 A1 * | 6/2008 | Priepke | ............ | A01B 71/063 |
| | | | | 172/1 |
| 2014/0311115 A1 * | 10/2014 | Verhaeghe | ......... | A01D 34/8355 |
| | | | | 56/251 |
| 2016/0128261 A1 * | 5/2016 | Figger | ............ | A01B 59/006 |
| | | | | 56/10.1 |

* cited by examiner

LATCHING DEVICE FOR HEADER MOUNTING APPARATUS

BACKGROUND OF THE INVENTION

1. Field of the Invention

The present invention relates to agricultural harvesters, and more specifically to apparatus for removably attaching a header to such harvesters.

2. Description of the Related Art

In the quest for ever increasing operational efficiency, agricultural harvesters incorporate easily removable headers to provide flexibility in the type of crop to be harvested. Along with the flexibility of changing out the header it has been a goal make the installation and removal as quick as possible but at the same time ensuring that the header, once in place, is safely secured against inadvertent disconnection.

Existing header assemblies are usually supported by a pair of lower lift arms pivotally secured to the main body of the agricultural harvester and a third arm between and above the lower lift arm. All three arms are pivotable through appropriate actuators to change the level of the header relative to the ground (and its attitude) to facilitate harvesting of varied crops. The connection between the lift arm and the header is accomplished by upwardly facing U-shaped recesses on the ends of the lift arm which mate with corresponding mounting pins on the header. In order for the mounting pins, and thus the header, to be safely secured to the agricultural harvester, a locking bar mounted on the lift arms is slidable between an unlocked position permitting installation and removal of the mounting pins and a locked position where the pins are captured in the U-shaped recesses. Because the parts are designed to lift substantial loads, the locking bar is actuated by a lever arm on the lift arm to accomplish this function. The lever arm then must be locked in its locked position so as to prevent inadvertent movement of the bar from its locked position. In the past, the locking function has been accomplished by a locking or lynch pin dropped by gravity through corresponding holes on the lever arm and the lift arm to hold it in place.

When harvesting certain crops such as canola, switch grass and miscanthus, the header does not ride close to the ground but is suspended anywhere from 2 to 18 inches off the ground. Selecting this height for the header leaves behind very tall and rigid stubble which can interfere with the pin holding the lever arm in its locked position. In fact, the pressure can be great enough to push the pin out of place. One solution to this is securing the lever in its locked position by a bolt which detracts from flexibility and speed of changing out the header.

Accordingly, what is needed in the art is a locking mechanism for a header attachment assembly that is resistant to post harvesting field conditions.

SUMMARY OF THE INVENTION

In one aspect of the present invention the ends are achieved by a mechanism that resists unlocking.

In one form, the invention is a lift arm apparatus having a lift arm with a U-shaped recess at its free end for receiving a mounting pin of a component. A bar is movable on the lift arm between an open position permitting installation and removal of the component mounting pin and a locked position holding the component mounting pin in the U-shaped recess. A lever arm is pivotally mounted on the lift arm and has a first end connected to the bar and a second end pivotable about a vertical axis between a locked and unlocked position permitting installation and removal of the component mounting pin in the U-shaped recess. A lever arm is pivotally mounted on the lift arm and has a first end connected to the bar and a second end pivotal about a vertical axis between an unlocked position permitting installation and removal of the component mounting pin wherein the second end is away from the lift arm and a locked position against the lift arm. A hook shaped latching device is pivotable about a horizontal axis adjacent the lift arm and above the plane of movement of the lever arm with the latching device having the hook facing the lift arm and pivotable between an unlatched upper position permitting movement of the lever arm away from the lift arm and a latched lower position in which the hook shaped latching device captures the lever arm to hold it adjacent the lift arm.

In another form, the invention is an agricultural harvester including a frame and ground drive wheels for driven movement. A header is removably secured to the frame by at least one lift arm pivotally attached to the frame and having a U-shaped and upwardly facing U-shaped recess at its free end for receiving a mounting pin of the header. An actuator is provided for raising and lowering the lift arms and thus the header. A bar is movable on the lift arm between an open position permitting installation and removal of the header mounting pin and a locked position holding the header mounting pin in the upwardly facing U-shaped recess. A lever arm is pivotally mounted on the lift arm and has a first end connected to the bar, the second end pivotable about a vertical axis between an unlocked position permitting installation and removal of the component mounting pin wherein the second end is away from the lift arm and a locked position against the lift arm. A hook shaped latching device is pivotable about a horizontal axis adjacent the lift arm and above the plane of movement of the lever arm, the latching device having a hook facing the lift arm and pivotable between an unlatched upper position permitting movement of the lever arm away from the lift arm and a latched lower position in which the hook shaped latching device captures the lever arm to hold it adjacent the lift arm.

One advantage of the present invention is superior resistance to crop stubble impact moving the latching device.

Another advantage is that the latching device is permanently mounted on the lift arm to avoid misplacing the device.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention and such exemplification is not to be construed as limiting the scope of the invention in any manner.

DETAILED DESCRIPTION OF THE INVENTION

Figure 1:
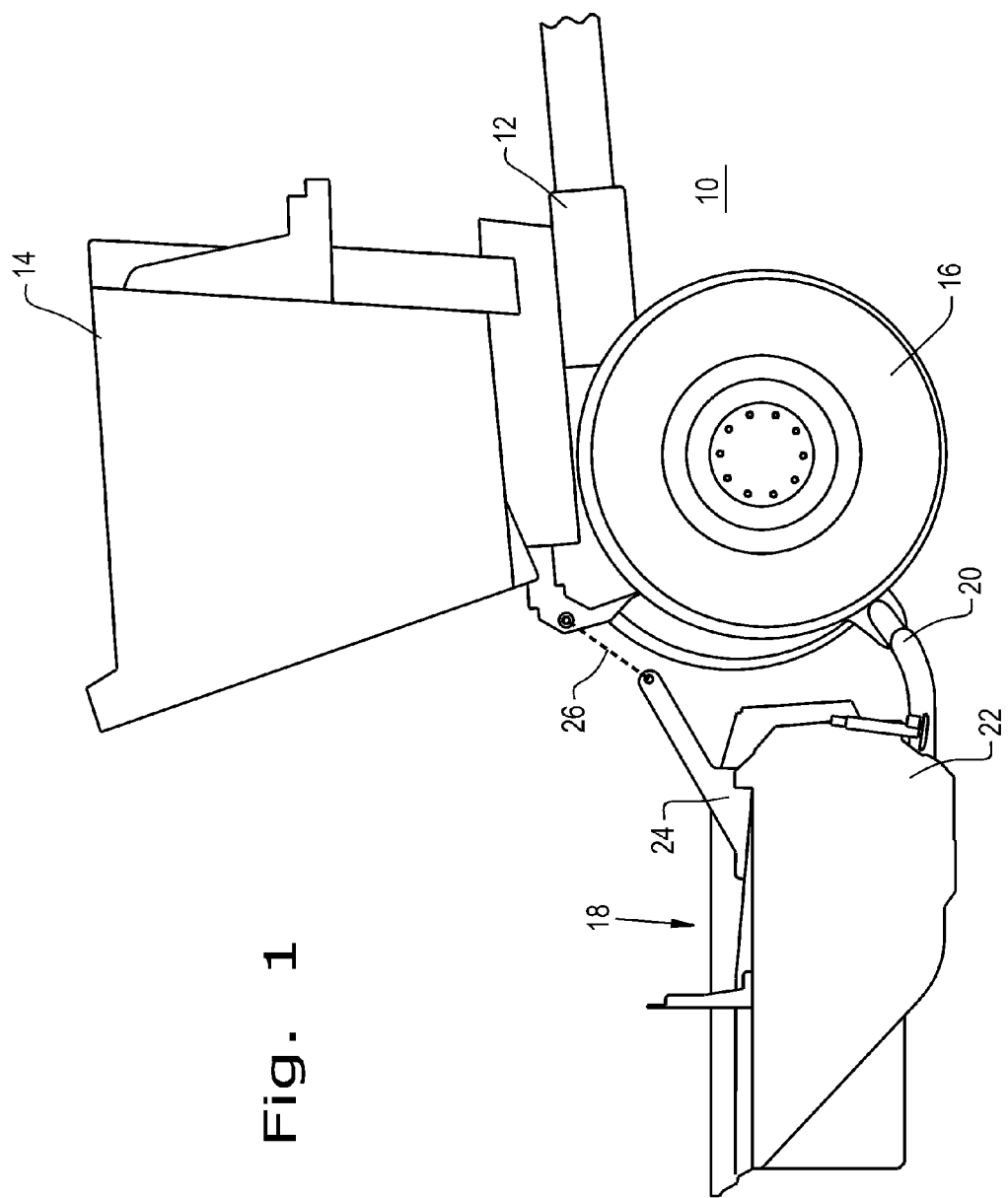
FIG. 1 is an elevational view of a portion of an agricultural harvester and a header with which the present invention may be used.

Referring now to the drawings, and more particularly to FIG. 1, there is shown an agricultural harvester 10 incorporating a frame 12 and an operator cab 14. Ground drive wheels 16 are provided to enable the harvester to traverse a field. A header assembly 18 is removably attached to the agricultural harvester 10 in a manner to be described below. To enable a clear understanding of the present invention, other portions of the agricultural harvester 10 are not shown such as a power unit, drive train and crop processing unit. It is to be understood by those skilled in the art that these may be implemented to complete the function of the agricultural harvester 10 in traversing a field, severing crops and processing them for the grain material.

Figure 2:
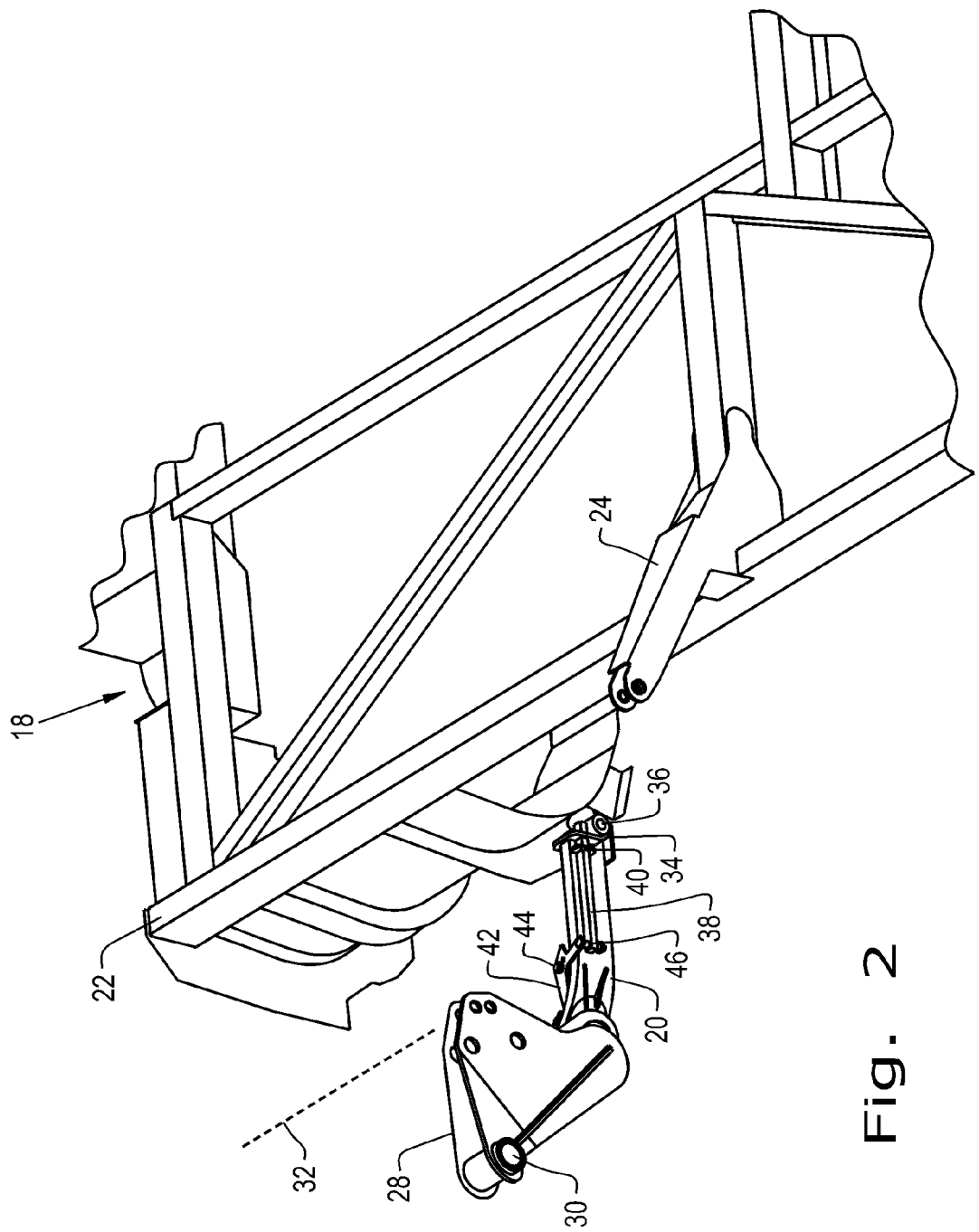
FIG. 2 is a perspective view of a portion of the agricultural harvester of FIG. 1 showing the interconnection between a header and the agricultural harvester.

The header 18 is supported at its bottom edge by lift arms 20 secured to the forward portion of agricultural harvester 10. The header 18 has a frame 22 and a central arm 24 which connects to an actuator 26 shown as a dashed line extending to frame 12. Referring particularly to FIG. 2, each lift arm 20 is connected to a plate 28 that is pivotally mounted to agricultural harvester 10 at 30 and which is connected to an actuator 32, shown as dashed line, to pivot the plate 28 and lift arm 20 about pivot point 30. The lift arm 20 has an upwardly facing U-shaped recess 34 at its far end which receives a mounting pin 36 secured to the rearward face of frame 22. The upwardly facing U-shaped recess 34 enables the header 18 to be connected and disconnected to the agricultural harvester 10.

In order for the header 18 to be locked in place, a bar 38 is mounted adjacent lift arm 20 and extends through an opening 40 to capture mounting pin 36 when the bar 38 is in its forward position. Bar 38 is actuated by a lever arm 42 pivotally secured to the lift arm 20 at an axis 44 which is vertical so that the lever arm 42 pivots in a horizontal plane.

Figure 3:
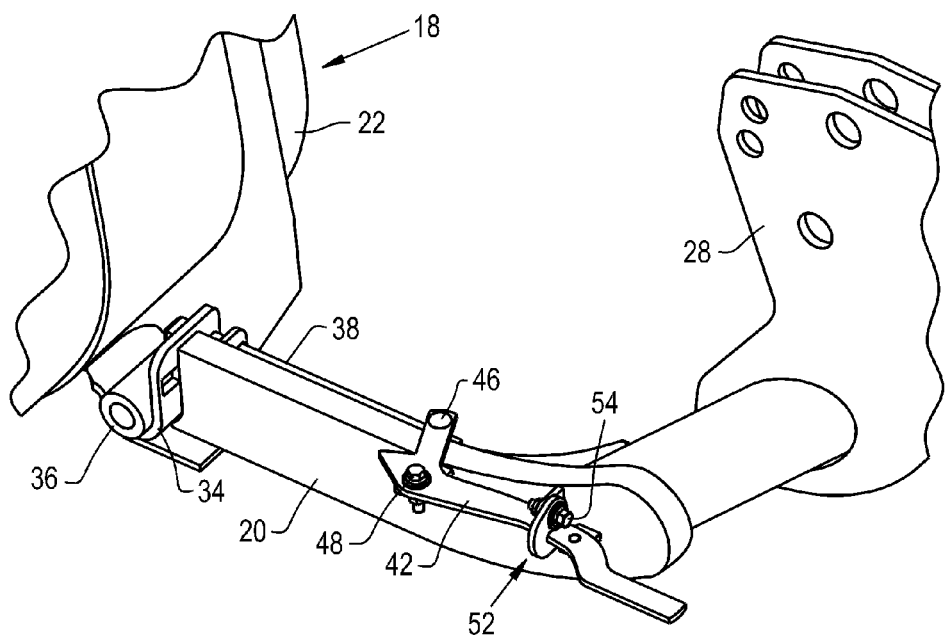
FIG. 3 shows a latch mechanism embodying the present invention in a locked position.
Figure 4:
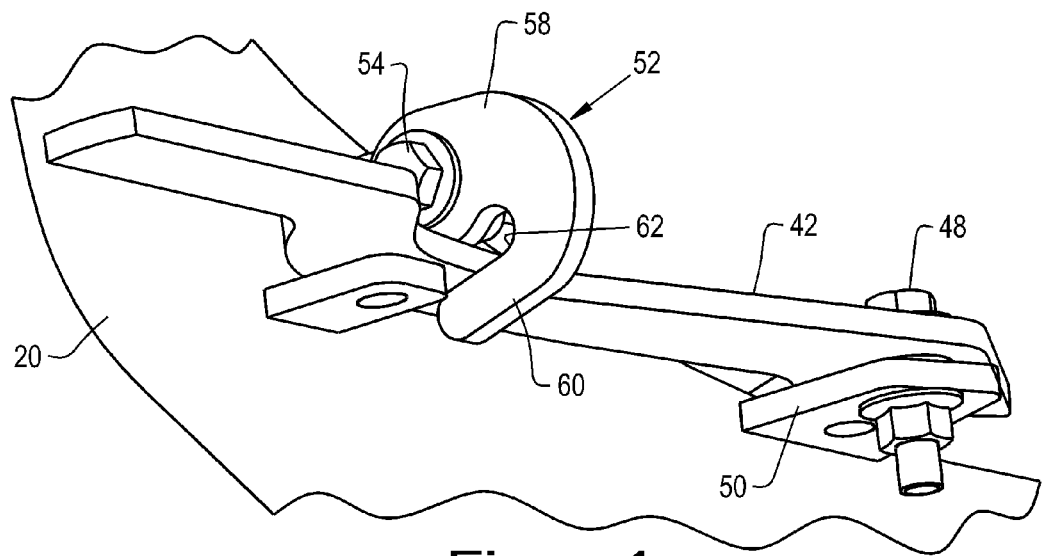
FIG. 4 is an expanded partial view of the latch mechanism of FIG. 3.

Referring now to FIG. 3, the lever arm 42 is pivotally connected to bar 38 at 46 so that the lever arm 42, when swung to a first locking position in which it is against lift arm 20, displaces the bar 38 sufficiently over upwardly facing U-shaped recess 34 to lock the mounting pin 36 in place. The lever arm 42 previously had been locked in place held in its locked position by pins extending through the lever arm 42 and an appropriate tab on the lift arm 20.

Figure 5:
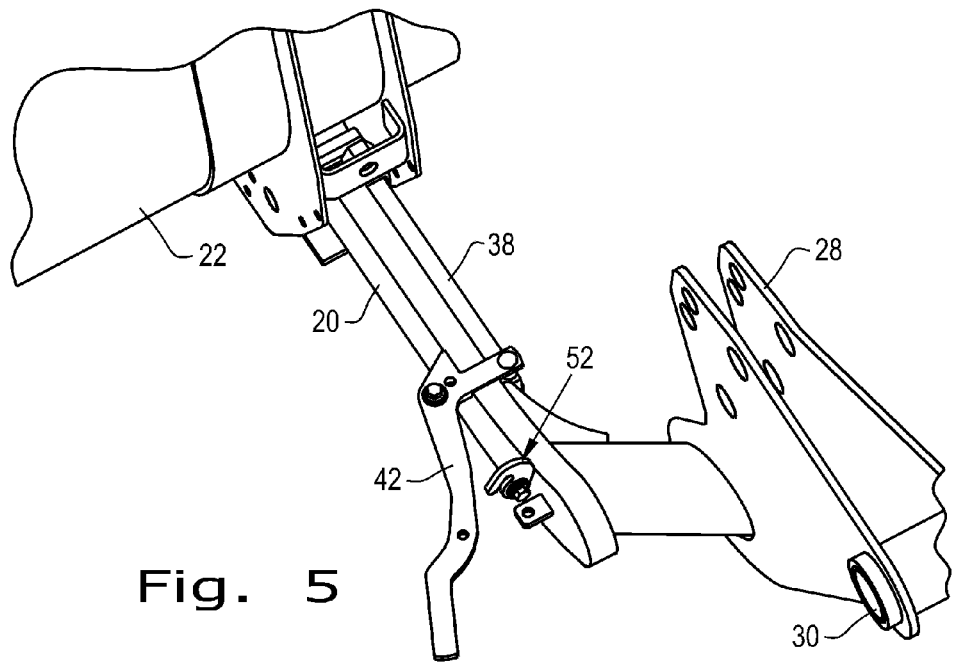
FIG. 5 is a perspective view of the latch mechanism of FIGS. 2 and 3 and an open position.
Figure 6:
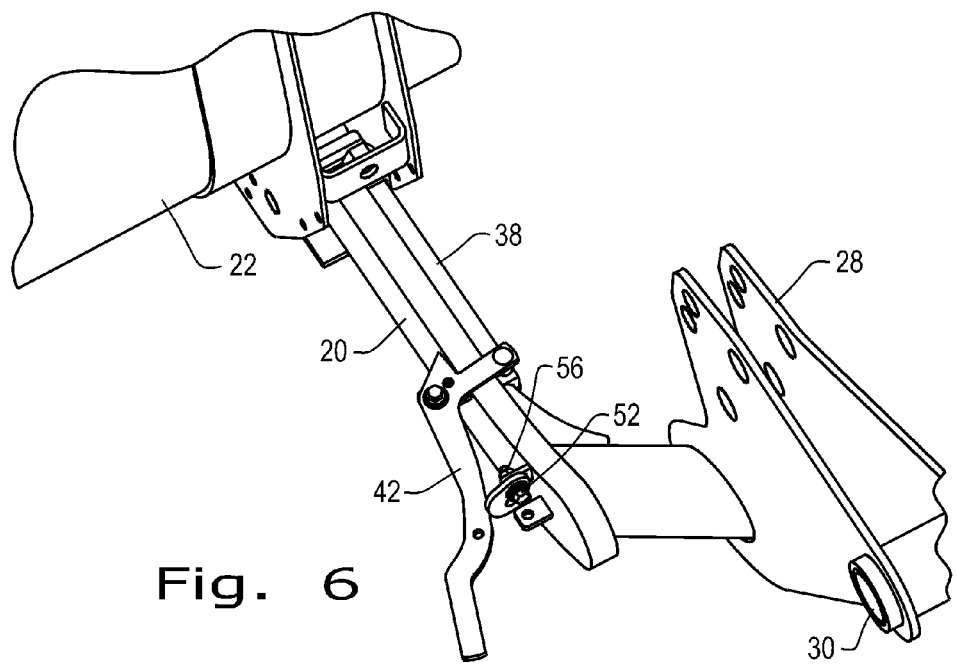
FIG. 6 is a perspective view also showing the latch mechanism in an unlocked position.

In accordance with the present invention, a hook shaped latching device 52 is provided. Hook shaped latching device 52 is pivotally mounted to a mounting tab 56 through a pivotal mounting 54 which is illustrated as a bolt and nut assembly. The hook shaped latching device 52 is pivotable about the pivot axis 54 in a plane that is at a right angle relative to the pivot axis 48 of lever arm 42. In addition, the pivot axis 54 is above the horizontal plane of movement of lever arm 42. The hook shaped latching device 52 may be formed from a plate having a generally circular base 58 with a circular hole surrounding the pivot axis 54 and an integral leg 60 which cooperates with the base 58 to form a hook shaped recess 62 that extends over and captures the lever arm 42 against the lift arm 20. The hook shaped latching device 52 is configured so that the leg and corresponding recess extend horizontally when it is in its locked position. This configuration is illustrated in FIG. 3 with the lever arm 42 against lift arm 20, thus holding the bar 38 in its locked position. As illustrated FIG. 5, the hook shaped latching device 52 may be pivoted to its upright and unlocked position in which it ceases to capture lever arm 22 and permits it to be swung out from lift arm 20 so that the bar 38 is in its unlocked position. This permits ready removal or installation of the header 18 on the lift arm 20. It is also possible, as shown in FIG. 6, to place the hook shaped latching device 52 in its downward and locked position with the lever arm 42 in its unlocked position. This ensures that the lever arm 42 will not be moved inadvertently to its locked position while the header 18 is being installed or removed.

In operation, with the hook shaped latching device in the position of FIG. 3, the lever arm 42 is securely held in place when the agricultural harvester is severing crops illustrated above. The stubble created by the crops tends to wedge itself between lever arm 42 and lift arm 20 urging the lever arm outward because of the hook shaped latching device 52 facing the lift arm 20, the impact from the stalks drives the lever arm 42 more securely into the slot 62 of the hook shaped latching device 52. Thus, the latching device 52 provides a secure arrangement to keep the lever arm 42 in its locked position. The latching device 52 when moved to its unlocked position allows the lever arm 42 to be swung away from lift arm 20 and enable release of the pins 36. If it is desired to make sure that the lever arm does not inadvertently move to its locked position, the latching device 52 may be pivoted to its locked position shown in FIG. 6 wherein the outer periphery of the latching device 52 positively prevents the lever arm from 42 from pivoting into the lift arm 20 and thus placing the bar 38 in a locked position. Because the latching device 52 is bolted to the lift arm 20, it remains a permanent component of the assembly and avoids the possibility of inadvertently losing locking pins, as in prior art devices.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A lift arm apparatus comprising:
   a lift arm having a U-shaped recess at its free end for receiving a mounting pin of a component;
   a bar movable on said lift arm between an open position permitting installation and removal of the component mounting pin and a locked position holding the component mounting pin in said U-shaped recess;
   a lever arm pivotally mounted on said lift arm and having a first end connected to said bar and a second end pivotable about a vertical axis between an unlocked position permitting installation and removal of the component mounting pin wherein the second end is away from said lift arm and a locked position against said lift arm; and,
   a hook shaped latching device pivotable about a horizontal axis adjacent said lift arm and above the plane of movement of said lever arm, said latching device having the hook facing said lift arm and pivotable between an unlatched upper position permitting movement of said lever arm away from said lift arm and a latched lower position in which the hook shaped latching device captures said lift arm to hold it adjacent said lift arm.

2. The lift arm apparatus as claimed in claim 1, wherein said latching device is formed from a plate and the hook portion is formed in part by a leg extending horizontally when said latching device is in its latched position.

3. The lift arm apparatus as claimed in claim 2, wherein said leg has a curved end.

4. The lift arm apparatus of claim 3, wherein said latching device has a hole through an upper section supporting said leg so that the upper section and the leg form the hook portion.

5. The lift arm assembly of claim 4, wherein said lift arm further comprises a tab extending perpendicularly from said lift arm and said latching device is pivotally secured to said tab by a bolt extending through said tab.

6. An agricultural harvester comprising:
a frame;
ground drive wheels connected to said frame for ground movement;
a header removably attached to said frame for harvesting agricultural crops, said header having at least one mounting pin;
at least one lift arm having a U-shaped lift arm connected to said frame for pivoting movement and having a U-shaped recess at its free end for receiving said mounting pin;
an actuator for raising and lowering the free end of said lift arm;
a bar movable on said lift arm between an open position permitting installation and removal of said header mounting pins and a locked position holding the header mounting pin in said U-shaped recess;
a lever arm pivotally mounted on said lift arm and having a first end connected to said bar and a second end pivotable about a vertical axis between an unlocked position permitting installation and removal of the component mounting pin wherein the second end is away from said lift arm and a locked position against said lift arm; and,
a hooked shaped latching device pivotable about a horizontal axis adjacent said lift arm and above the plane of movement of said lever arm, said latching device having the hook facing said lift arm and pivotable between an unlatched upper position permitting movement of said lever arm away from said lift arm and a latched lower position in which the hook shaped latching device captures said lever arm to hold it adjacent said lift arm.

7. The agricultural harvester as claimed in claim 6, having a pair of lift arms and said header has a pair of pins receivable in the U-shaped recesses of said pair of lift arms.

8. The agricultural harvester as claimed in claim 6, wherein said hook-shaped latching device is positionable in its locked position when said lever arm is pivoted away from said lift arm thereby preventing said lever arm from moving said bar into its locked position during installation of said pin in said U-shaped recess.

9. The agricultural machine as claimed in claim 6, wherein said latching device is a plate and the hook portion is formed by a leg extending horizontally when said latching device is in its latched position.

10. The agricultural machine as claimed in claim 9, wherein said leg has curved ends.

11. The agricultural harvester of claim 9, wherein said latching device has a substantially circular upper section through which a hole is provided and integral with said leg.

12. The agricultural harvester as claimed in claim 10, further comprising a tab on and extending perpendicularly from said lift arm and said latching device is bolted to said tab through the hole through the upper circular section.

\* \* \* \* \*